United States Patent [19]
Graafsma

[11] 3,977,267
[45] Aug. 31, 1976

[54] POWDERED METAL GEAR FOR SCREW JACK

[75] Inventor: Richard S. Graafsma, Benton Harbor, Mich.

[73] Assignee: Auto Specialties Manufacturing Company, St. Joseph, Mich.

[22] Filed: Jan. 27, 1975

[21] Appl. No.: 544,384

Related U.S. Application Data

[63] Continuation-in-part of Ser. No. 464,362, April 26, 1974.

[52] U.S. Cl. .................................. 74/416; 74/434; 74/459.5
[51] Int. Cl.² ..................... F16H 1/12; F16H 55/04
[58] Field of Search .................... 74/434, 416, 459.5

[56] References Cited
UNITED STATES PATENTS

| | | |
|---|---|---|
| 3,184,988 | 5/1965 | Osplack et al. ............... 74/459.5 X |
| 3,768,327 | 10/1973 | Dunn et al. ........................... 74/434 |
| 3,772,935 | 11/1973 | Dunn et al. ........................... 74/434 |

*Primary Examiner*—Leonard H. Gerin
*Attorney, Agent, or Firm*—Olson, Trexler, Wolters, Bushnell & Fosse, Ltd.

[57] ABSTRACT

A powdered metal gear is disclosed for use in an accommodating screw jack. The gear has a planar face, and teeth of generally truncated tetrahedronal shape are disposed around the circumference. A conical gear undersurface acts, with intertooth recesses, to form a first gear portion of substantially uniform material thickness. Scallop indentations in the undersurface mate with the gear teeth themselves to form a second gear portion of substantially uniform material thickness.

8 Claims, 7 Drawing Figures

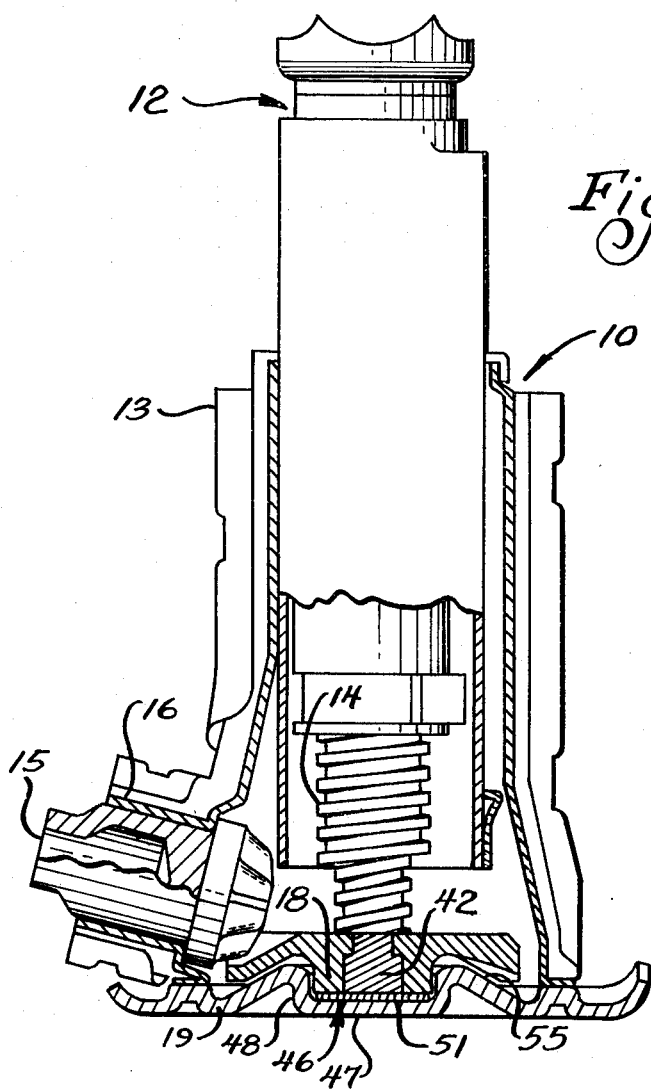
Fig. 1
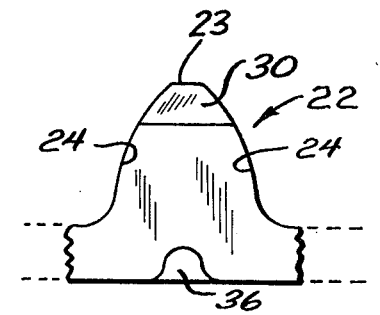
Fig. 4
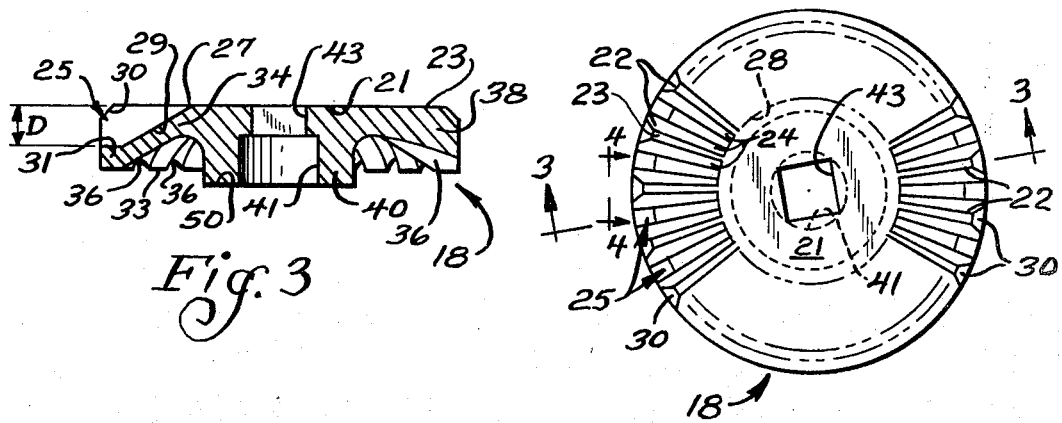
Fig. 3
Fig. 2

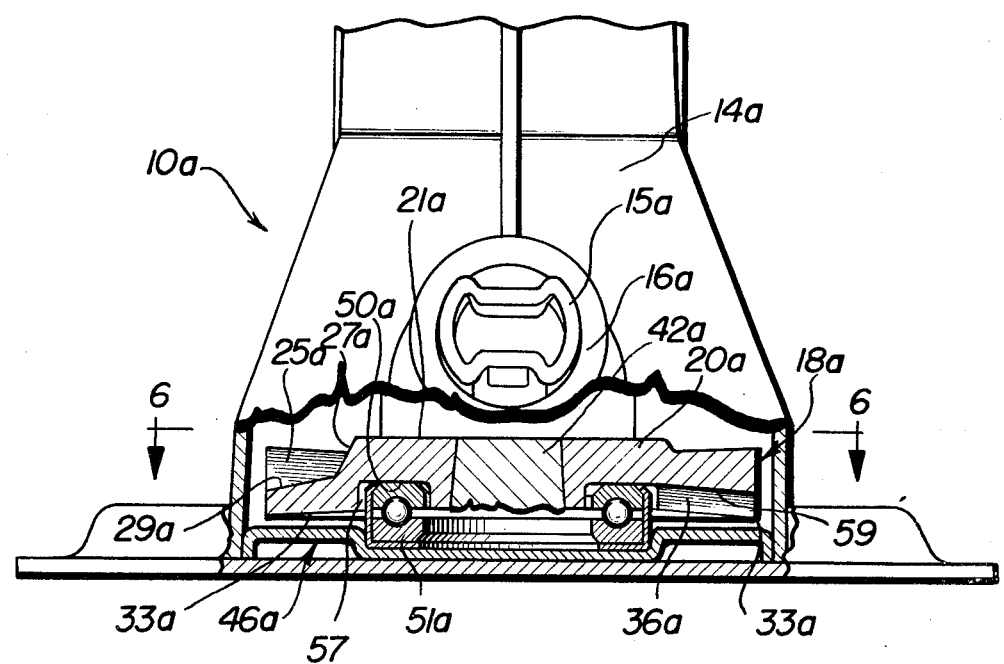
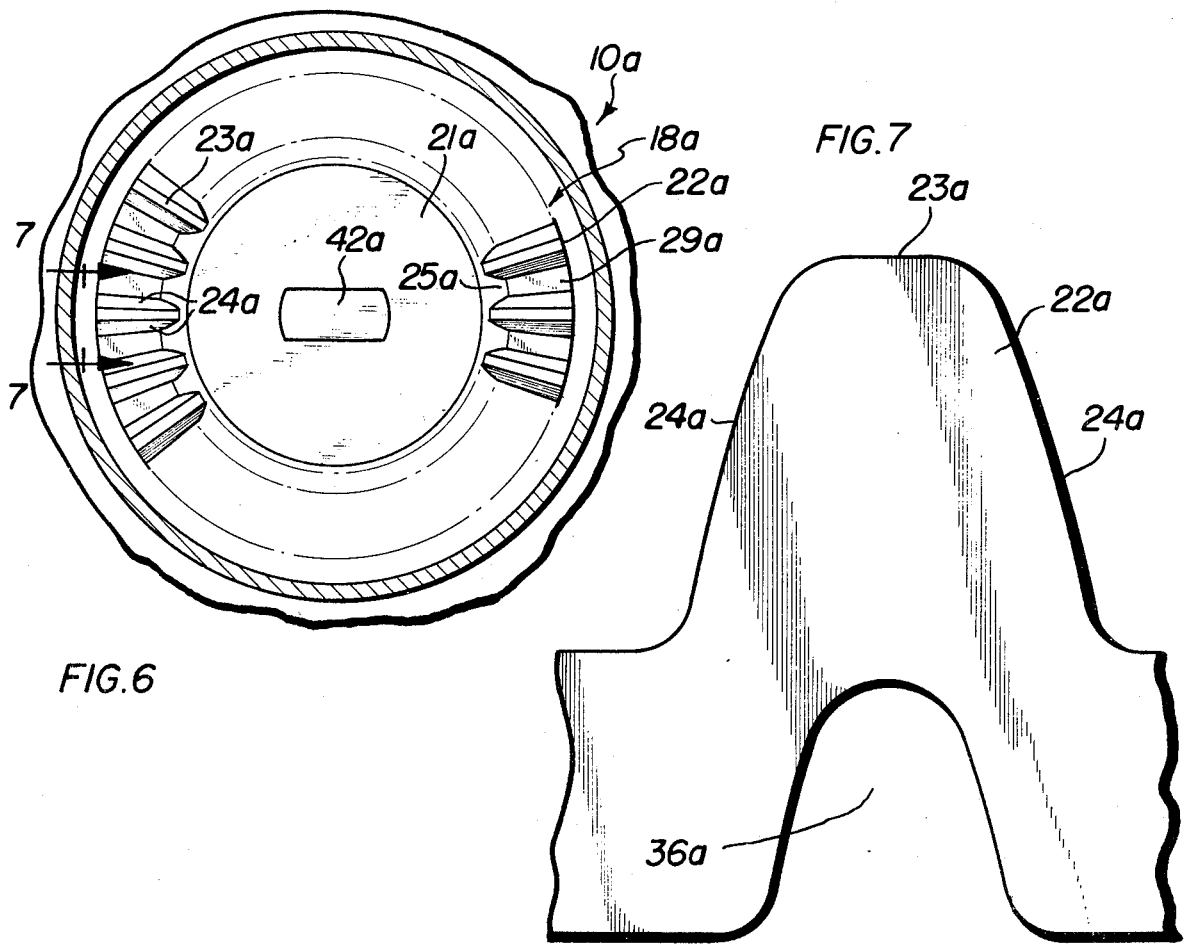

POWDERED METAL GEAR FOR SCREW JACK

BACKGROUND OF THE INVENTION

This is a continuation-in-part of my co-pending application Ser. No. 464,362 filed Apr. 26, 1974.

This invention relates generally to screw jacks and the like, and more particularly concerns gear members for use in the operation of such jacks.

It is the general object of the present invention to provide an improved gear for use in screw jacks and like mechanisms.

It is a more specific object of the invention to provide a screw member drive gear for screw jacks or like mechanisms which has a relatively good surface finish and relatively precise finished dimensions.

Another object of the invention is to provide a gear for driving a screw jack screw member or like mechanism which is formed of powdered metal, and which has a long service life. A related object is to provide such a gear which also has relatively uniform material density in the tooth, as well as in other portions of the gear. An ancillary object is to provide such a gear which is formed to mate with a maximized number of related screw jack parts without requiring specially altered mating part design.

A further object is to provide a gear for use in screw jacks and the like which can be manufactured without the usual machining and heat treating operations.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is an elevational view of a typical screw member jack used for lifting automobiles and the like, bottom portions of the jack member being shown in cutaway and sectional aspects for clarity;

FIG. 2 is a top plan view of the novel screw member drive gear of the present invention;

FIG. 3 is a sectional view of the gear member taken substantially in the plane of line 3—3 in FIG. 2;

FIG. 4 is a fragmentary elevational view taken substantially in the plane of line 4—4 in FIG. 2 and showning in elevational aspect a typical gear tooth;

FIG. 5 is a fragmentary elevational view partially broken away showning a modified form of the present invention;

FIG. 6 is a sectional view taken along line 6—6 in FIG. 5; and

FIG. 7 is an enlarged fragmentary view taken along line 7—7 in FIG. 6.

DETAILED DESCRIPTION OF THE ILLUSTRATED EMBODIMENT

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Turning first to FIG. 1, there is shown a screw jack 10 embodying the present invention. To lift automobile under-frames or other loads (not shown) a load-engaging member 12 is mounted for at least partial extension from or retraction into a housing 13. This housing 13 can be formed by stamping, by die casting, or by other known methods. In the illustrated embodiment, extensive or retractive motion of the load member 12 is caused by a rotatable screw member 14 appropriately mounted within the housing 13. Rotation of the screw member 14 is caused, in turn, by a gear drive train which includes a pinion side gear 15, here carried in an appropriate jack housing journal 16. This side gear 15 may be manufactured by cold forming or other known means, and engages and turns a novel bottom gear 18 which is fixed to the screw member 14 for common bottom gear-screw member rotation.

The housing 13 and at least parts of the bottom gear 18 are supported on a base plate 19 which is adapted to rest upon the ground or another foundation surface (not shown). Gear rotating means such as a jack handle (not shown) can be applied to the pinion gear 15 to permit the jack operator to easily use the jack and raise or lower the supported load.

In accordance with one aspect of the invention, this screw member drive gear 18 is formed of powdered metal; this part formation process permits precise dimensional control and good surface finish at relatively low cost. To obtain long part service life and good part performance in further accordance with the invention, it has been found helpful to form the gear 18 with constituent metal thicknesses which are relatively uniform.

As shown particularly in FIGS. 2 and 3, the gear is provided with a hub portion 20 having planar top surfaces 21 and a bottom surface 50, radially elongated teeth 22 of tetrahedronal shape are formed integrally with and radiate from the circumference of the gear hub. In this embodiment, these teeth 22 preferably do not extend above the gear top 21 as in some crown gears, but, rather, each tooth 22 is at least partially defined by a crest surface 23 preferably generally parallel to or providing extension of the planar gear top 21. Moreover, the sides or flanks 24 of the teeth 22 are at least partially defined by recesses 25 which are of generally triangular elevational cross-section, as best seen in FIG. 3. Each recess 25 and its elevational cross-section can be considered to originate at a tip 27 which is located upon a small circle 28 on the planar gear face 21, as shown in FIG. 2. Adjacent teeth are separated from each other by recess bottom surfaces 29, the depth of which gradually increases as it moves toward the outer gear circumference to a maximum depth D, here located radially outside the small originating circle 28, as shown in FIG. 3.

To assist in gear formation and long tooth life, each illustrated tooth 22 is provided with a bevelled tip 30. Where necessary, tooth root extensions 31 oriented generally parallel to the gear face 21 are provided to increase tooth structure for interengagement with the mating pinion side gear 15.

A uniform gear material thickness is provided in further accordance with the invention by constructing the gear 18 with an undersurface 33 generally parallel to the bottom surfaces 29 of the recess 25. In this embodiment the surface 33b is of generally truncated conical shape. Thus, undersurface 33 generally parallels the sloping or tapered surfaces 29 of the recesses 25 to form, between each recess taper 25 and the gear underside 33, a portion 34 of the gear 18 which is conical and yet is substantially uniform in material thickness.

In still further accordance with the invention, roots 35 of the teeth are hollowed so that the material thickness between the crests 23 and the undersurface remains generally uniform throughout the radial extent of the teeth. In the embodiment, the gear undersurface 33 is provided with indented scallop formations 36, as shown in FIGS. 3 and 4. These scallop portions are formed, as illustrated particularly in FIG. 4, to register with each gear tooth 22 thereby defining, between the gear undersurface 33 and scallops 36, a second portion 38 of the gear 18 which is substantially uniform in its material thickness.

To securely connect the gear 18 to the screw member 14 with low stress, and to prevent relative rotation between these two parts, a gear hub 20 extends below the gear undersurface 33. The hub material defines a hole 41 formed to mate with a stem 42 provided at one end of the screw member 14. Rotation between the screw member lug 42 and the gear 18 is prevented by forming this hole 41 with at least one straight edge 43; here, the hole 41 has a square cross-sectional shape over at least a portion of its depth.

It is a feature of the invention that the jack base plate 19 is designed to accommodate this novel gear 18 and mount it in the jack at a low position. In the illustrated embodiment, the stamped base plate 19 has a centralized gear hub-receiving journal well 46 including a relatively flat bottom portion 47 and an annular wall 48 of substantially right cylindrical shape. A washer 51 is provided over the well bottom 47 to minimize friction between the gear 18 and base plate 19 as the gear turns. To further lower the position of the gear 18 on the plate 19, the hub 46 is surrounded by a generally truncated conical base plate surface 55 which conforms generally to the conical undersurface 33 of the gear.

Referring now to FIGS. 5, 6 and 7, there is shown a modified form of the present invention in which elements corresponding to those described above are identified by identical reference numerals with the suffix *a* added. In general, this embodiment differs in that the hub portion 20a is formed with an annular recess 57 in the lower side thereof so that its planar radially extending lower surface 50a is recessed. Furthermore, in this embodiment, the jack structure is provided with a ball type thrust-bearing unit 51a which is adapted to fit within the recess 57 for engagement with the bottom gear surface 50a. This arrangement enables the use of ball type thrust-bearings for enabling the jack to more efficiently support heavier loads without substantially raising the level of the lower gear 18a.

The gear 18a illustrates one manner in which the specific shape of the teeth 22a can be modified while still obtaining generally uniform material thicknesses throughout the cross-section. In this embodiment, crests 23a of the teeth 22a are slightly recessed below the top surface 21a of the gear so that, is combination with the recess 57 in the bottom of the gear, the substantial axial dimension of the ball-type thrust bearing may be accommodated without significantly raising the elevation of the teeth crests so that the gear is adapted to mesh with the pinion 15a located in the jack at substantially the same location as the above-described pinion 15. As shown in FIG. 5, upper edges 59 of the hollows or scallops 36a formed in the lower surface 33a and thus in the roots of the teeth 22a generally follow the conical configuration of the lower surface 33a and thus diverge slightly with respect to the radiating crests 23a of the teeth. However, this diversion is slight and the relationship between the teeth crests and the upper edges of the recesses or scallops is such as to maintain the desired general uniformity in the material thickness of the teeth throughout the cross-section thereof. If desired, tips of the teeth may be provided with bevelled surfaces in the manner of the gear described above.

While preferred embodiments of the present invention have been shown and described herein, it is obvious that many structural details may be changed without departing from the spirit and scope of the appended claims.

The invention is claimed as follows:

1. A sintered powdered metal gear for use in a screw jack or the like, comprising a hub portion including an upper face and a lower face adapted to engage a support on the jack such as a thrust-bearing, and teeth of generally truncated tetrahedral shape disposed around and radiating from the gear hub circumference, each tooth having gernerally radially extending crests being defined at least in part by radiating gear surface elements and in further part by spaced apart radiating recesses having radially extending hollow surfaces, the gear further including an undersurface having surface portions disposed generally parallel to each tooth-defining recess bottom surface to form, between the recess bottom surfaces and the gear undersurface, a radiating portion of the gear which is substantially uniform in material thickness.

2. A gear according to claim 1 including a central hub extending below the undersurface of said gear.

3. A gear according to claim 2 wherein said hub at least partly defines a central hole having at least one straight edge.

4. A gear according to claim 3 wherein said hub defines a central hole of substantially rectangular cross-section which is adapted to recieve a screw member stem and fix said stem against gear-stem relative rotation.

5. A gear according to claim 1, wherein said teeth have hollow roots defined by a recessed surface in said undersurface generally following said teeth crests, the gear material between said recessed surface and said teeth crests being of generally uniform thickness.

6. A gear according to claim 1 wherein said crest surface elements are substantially co-planar with an upper surface of said gear.

7. A gear according to claim 1 including annular surface means located at a lower side of said hub portion and recessed above a lower surface of said radiating portion of the gear of substantially uniform material thickness for engagement with a supporting thrust-bearing of a jack or the like, and said crest surface elements are disposed beneath said upper face of the hub portion.

8. A gear for use in a screw jack or the like comprising a planar face, and teeth of generally truncated tetrahedronal shape disposed around the gear circumference, each tooth being defined at least in part by the planar gear top and in further part by spaced apart recesses of generally triangular elevational cross-section which taper from respective points around a circle on the planar gear face to maximum depths, the gear further including a generally truncated, conical, scalloped undersurface having surface portions disposed generally parallel to each tooth-defining tapered recess to form, between the recess tapers and the gear undersurface, a first portion of the gear which is substantially uniform in material thickness, and the indented scallops registering with the gear teeth to form, between the undersurface scallops and the teeth surfaces, a second portion of the gear which is substantially uniform in material thickness.

* * * * *